Jan. 7, 1958 M. E. WEISS 2,818,686
ROTATING ULTRASONIC DRILL
Filed Feb. 28, 1956
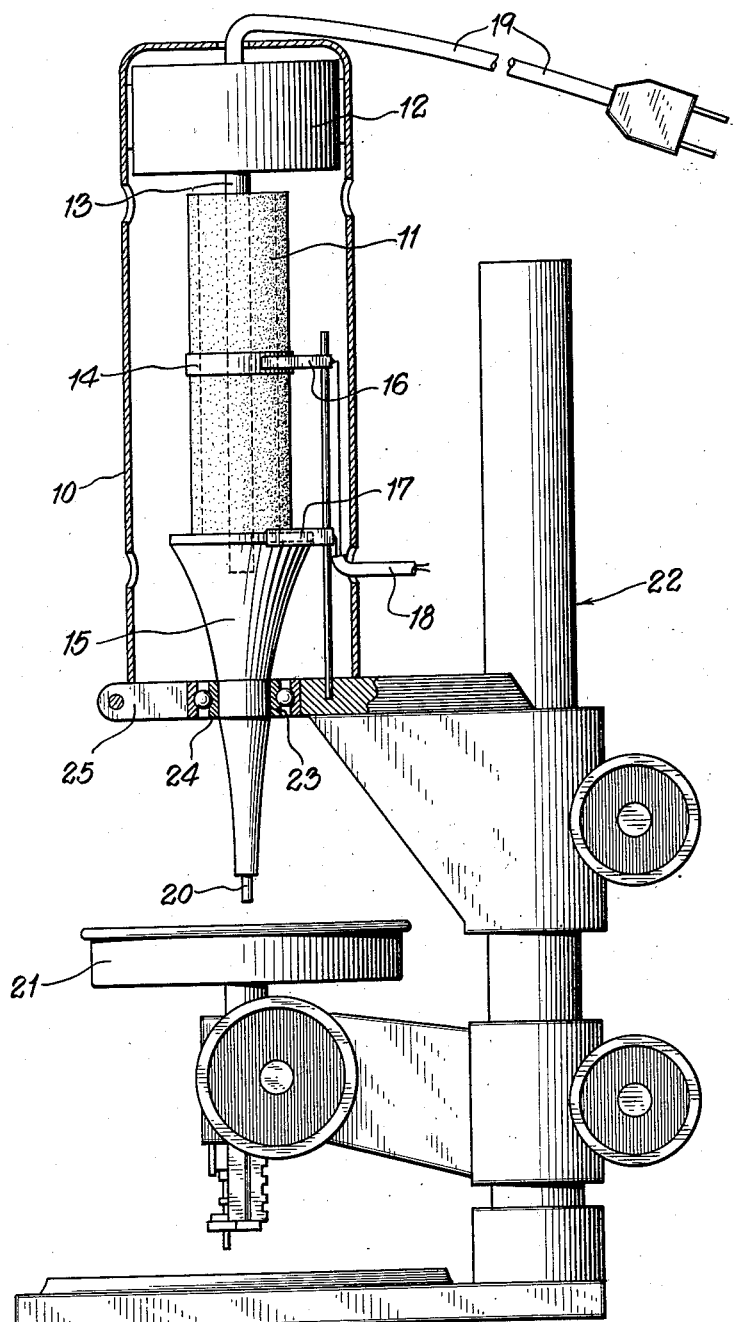
INVENTOR.
MORTIMER E. WEISS
BY
ATTORNEY

United States Patent Office 2,818,686
Patented Jan. 7, 1958

2,818,686

ROTATING-ULTRASONIC DRILL

Mortimer E. Weiss, Flushing, N. Y., assignor to Gulton Industries, Inc., Metuchen, N. J., a corporation of New Jersey Application February 28, 1956, Serial No. 568,224

6 Claims. (Cl. 51—56)

My invention relates to ultrasonic drills and in particular to those ultrasonic drills wherein the tool end is rotated mechanically in addition to vibrating axially at an ultrasonic rate.

The use of ultrasonic drills for making holes or intaglios in hard, brittle materials is well known. These techniques utilize the so-called longitudinal or axial mode of vibration wherein the tool end vibrates parallel to the axis of the drill and abrasive particles in suspension are driven against the work at high velocity. These particles attain high velocity due to the high acceleration developed by the tool end, resulting in erosion of the work piece directly under the tool.

Mechanical rotational drilling has been used in the cutting of circular holes and intaglios for many years. However, this method is not satisfactory for the drilling of hard or brittle materials such as glass, ceramics, sapphires, diamonds, tungsten carbide and like materials because of shattering, cracking and similar effects. These deleterious effects result because the velocity of rotation of the cutting tool is not great enough and because the material being cut is harder than the tool cutting material.

When ultrasonic cutting is employed in conjunction with an abrasive slurry, it has been found that holes and intaglios may be cut in hard, brittle materials with very little difficulty. However, it is desirable to increase the drilling rate substantially over that of either of the systems described above and it is also desirable to obtain holes and intaglios which are perfectly symmetrical.

Accordingly, it is a principal object of my invention to provide an ultrasonic drill whose rate of cutting is high.

It is a further object of my invention to provide an ultrasonic drill which cuts holes which are symmetrical.

It is a still further object of my invention to provide an ultrasonic drill wherein the wear on the tool ends is uniform.

It is a still further object of my invention to provide a drill which combines axial ultrasonic cutting with mechanical rotational cutting.

Other objects and advantages of my invention will be apparent during the course of the following description wherein the figure is a side elevational view, partly in section, of a preferred embodiment of my invention.

The drill housing is designated by 10, the electro-mechanical transducer by 11 and the motor by 12. Spindle 13 is coupled to motor 12 at one end and is suitably affixed into horn 15 at its other end by force fitting, threading or similar means. Conductive band 14 is placed around 11 at the nodal surface. Brush contact 16 makes contact with 14 and brush contact 17 makes contact with horn 15. The ultrasonic excitation is applied to 16 and 17 by means of electrical conductors which are a part of cable 18. Electrical current is applied to motor 12 through cable 19. Tool end 20 is mounted to horn 15 and acts against the work piece which is placed on table 21. The stand is designated, generally, by 22. Horn 15 is held in the inner race of sleeve type ball bearing 24 at the straight portion 23 of the double-cone. The outer race of 24 is clamped in support 25.

Horn 15 is in the shape of a double cone such as I have described in my copending application Serial No. 535,677. The flat portion 23 occurs at the nodal surface of 15 which permits the unit to be clamped at this point without affecting the operation.

The operation of stand 22 and table 21 is substantially as has been described in my copending application Serial No. 535,677.

Spindle 13 is fixedly attached to motor 12 at one end and is threaded into or otherwise attached to horn 15 at the other end. Band 14 makes electrical contact with the outer electrode (not shown) of transducer 11 and the inner electrode (not shown) of transducer 11 is in contact with horn 15 which is of metal or other electrically conductive material. The outer electrode of 11 is stopped a short distance from the lower end of 11 in order to prevent horn 15 from short circuiting the inner and outer electrodes of 11.

Cylindrical section 23 of horn 15 is located at the nodal surface of 15. 15 is force fitted into the inner race of ball bearing 24. The outer race of 24 is securely clamped in support 25, thereby permitting 15 to rotate freely. Transducer 11 is securely cemented to horn 15 by means of a high strength thermo-setting plastic adhesive.

When motor 12 rotates, it causes spindle 13 to rotate which in turn rotates horn 15, transducer 11 and tool end 20. Brush contacts 16 and 17 make electrical contact with band 14 and horn 15 and through them to the inner and outer electrodes of 11. Excitation voltage is applied to 11 through brush contacts 16 and 17 by means of cable 18 which is connected to the ultrasonic generator (not shown). The ultrasonic excitation causes transducer 11 to vibrate in its longitudinal or axial mode, thereby causing 15 and 20 to vibrate axially also. Thus, tool end 20 has two motions: the first, rotational due to motor 12; and the second, axial due to transducer 11.

I have found that the combination of these two motions increases the drilling rate substantially over any other presently known method. The abrasive slurry performs a dual function. Some of the abrasive particles become firmly lodged in the surface of the tool end 20 and act as a grinding compound abrading the work as 20 rotates. The abrasive particles which remain in suspension are driven against the work piece at a high velocity due to the high acceleration developed by the ultrasonically vibrating tool end and erodes the work directly under the tool end. The combination of the two motions results in more symmetrical holes since the drilling tool end wears more uniformly than it does when it is not rotating.

While I prefer that transducer 11 be a cylinder composed largely of barium titanate, other shapes and types of electro-mechanical transducers may be employed equally effectively.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An ultrasonic drill comprising an electro-mechanically sensitive body; a horn fixedly attached to one end of said body; said horn being supported at its nodal surface within bearing means leaving said horn free to rotate; a tool end fixedly attached to the small end of said horn; means for rotating said horn and means for applying ultrasonic excitation to said electro-mechanically sensitive body.

2. An ultrasonic drill as described in claim 1 wherein said electro-mechanically sensitive body is a hollow cylinder.

3. An ultrasonic drill as described in claim 2 wherein said electro-mechanically sensitive body is composed largely of barium titanate.

4. An ultrasonic drill as described in claim 1 wherein said horn comprises a dual horn with a flat section at its nodal surface.

5. An ultrasonic drill as described in claim 1 wherein said means for rotating said horn comprises a motor coupled to said horn.

6. An ultrasonic drill as described in claim 1 wherein said means for applying ultrasonic excitation comprises a pair of contacts making electrical contact to the electrodes of said electro-mechanically sensitive body.

References Cited in the file of this patent
UNITED STATES PATENTS

| | | |
|---|---|---|
| 2,388,610 | Hanemann | Nov. 6, 1945 |
| 2,445,934 | Bodine | July 27, 1948 |
| 2,554,005 | Bodine | May 22, 1951 |